(12) United States Patent
Uryu et al.

(10) Patent No.: US 8,310,119 B2
(45) Date of Patent: Nov. 13, 2012

(54) ELECTRIC MOTOR

(75) Inventors: Nobuhiko Uryu, Kariya (JP); Yoshikazu Fujii, Toyohashi (JP)

(73) Assignees: Denso Corporation, Kariya (JP); Asmo Co., Ltd., Kosai (JP)

( * ) Notice: Subject to any disclaimer, the term of this patent is extended or adjusted under 35 U.S.C. 154(b) by 258 days.

(21) Appl. No.: 12/851,326

(22) Filed: Aug. 5, 2010

(65) Prior Publication Data

US 2011/0031851 A1 Feb. 10, 2011

(30) Foreign Application Priority Data

Aug. 7, 2009 (JP) ................. 2009-184137

(51) Int. Cl.
*H02K 11/00* (2006.01)

(52) U.S. Cl. .................................... 310/68 B

(58) Field of Classification Search ............ 310/64, 310/68 B, 68 R, 71, 89
See application file for complete search history.

(56) References Cited

U.S. PATENT DOCUMENTS

| | | | |
|---|---|---|---|
| 5,770,933 A * | 6/1998 | Larson et al. | 318/400.41 |
| 5,900,687 A | 5/1999 | Kondo et al. | |
| 2004/0090130 A1 | 5/2004 | Kaneko et al. | |
| 2008/0211357 A1 * | 9/2008 | Kataoka et al. | 310/68 B |

FOREIGN PATENT DOCUMENTS

| | | |
|---|---|---|
| JP | 05-055768 | 7/1993 |
| JP | 10-234158 | 9/1998 |
| JP | 10-248187 | 9/1998 |
| JP | 10-322973 | 12/1998 |
| JP | 2004-159454 | 6/2004 |
| JP | 2005-328654 | 11/2005 |
| JP | 2006149038 A * | 6/2006 |
| JP | 2007-252133 | 9/2007 |
| JP | 2007-330035 | 12/2007 |
| JP | 2008-312393 | 12/2008 |

* cited by examiner

*Primary Examiner* — Tran Nguyen
(74) *Attorney, Agent, or Firm* — Nixon Vanderhye PC

(57) ABSTRACT

A shaft is adapted to be inserted through a circuit apparatus without a need for disassembling a shaft side sensor device from an end part of the shaft to place the shaft side sensor device in an opposed relationship to a circuit board side sensor device at a location adjacent to the circuit board side sensor device. The shaft side sensor device forms a sensor apparatus in cooperation with the circuit board side sensor device to sense a rotational angle of the rotor.

14 Claims, 3 Drawing Sheets

ELECTRIC MOTOR

CROSS REFERENCE TO RELATED APPLICATION

This application is based on and incorporates herein by reference Japanese Patent Application No. 2009-184137 filed on Aug. 7, 2009.

BACKGROUND OF THE INVENTION

1. Field of the Invention

The present invention relates to an electric motor having a circuit apparatus therein.

2. Description of Related Art

An electric power steering (EPS) system, which assists a steering operation of a driver for steering a vehicle, is known. In an electric motor used in the EPS system, it is important to sense a rotational angle of a rotor.

Japanese Unexamined Utility Model Publication No. H05-55768U teaches a rotation sensing device, in which a permanent magnet is placed at an end part of a shaft, and a sensor is installed to a circuit board in such a manner that the sensor is opposed to the permanent magnet. In this rotation sensing device, a yoke, which has a relatively large diameter, is installed to the end part of the rotatable shaft, and the permanent magnet (pole magnet) is attached to the yoke. The sensor (pole sensor) is installed to the circuit board to oppose the permanent magnet.

However, in the case of the rotation sensing device disclosed in Japanese Unexamined Utility Model Publication No. H05-55768U, there is a possible disadvantage in terms of an assembling process thereof. For example, at the time of assembling the rotation sensing device, the yoke needs to be installed to the rotatable shaft with screws after insertion of the rotatable shaft. Furthermore, at the time of disassembling the rotor, which is integrated with the rotatable shaft, in the case of performing, for example, a maintenance work, the yoke, which is secured to the end part of the rotatable shaft with the screws, needs to be first removed from the rotatable shaft. Therefore, the time required for the assembling work or the maintenance work is disadvantageously lengthened.

Here, although the motor used in the EPS system is discussed above, the above discussed disadvantages are also found in other ordinary motors.

SUMMARY OF THE INVENTION

The present invention addresses the above disadvantages. According to the present invention, there is provided an electric motor, which includes a drive apparatus, a circuit apparatus and a motor case. The drive apparatus includes a stator, a rotor and a shaft. The rotor is placed radially inward of the stator and is rotatable relative to the stator. The shaft is rotatable integrally with the rotor. The circuit apparatus is placed on one side of the drive apparatus in an axial direction of the shaft and includes a drive device, which drives the drive apparatus. The motor case has a partition wall. The partition wall partitions between a drive space, in which the drive apparatus is placed, and a circuit space, in which the circuit apparatus is placed, in the axial direction in the motor case. The circuit apparatus includes a circuit board. The circuit board is placed at an end part of the circuit space, which is apart from the drive apparatus in the axial direction. The circuit board has a circuit board side sensor device that forms a sensor apparatus, which senses a rotational angle of the rotor. The shaft has a shaft side sensor device at an end part of the shaft to correspond with the circuit board side sensor device. The shaft side sensor device forms the sensor apparatus in cooperation with the circuit board side sensor device. The shaft is adapted to be inserted through the circuit apparatus without a need for disassembling the shaft side sensor device from the end part of the shaft to place the shaft side sensor device in an opposed relationship to the circuit board side sensor device at a location adjacent to the circuit board side sensor device.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
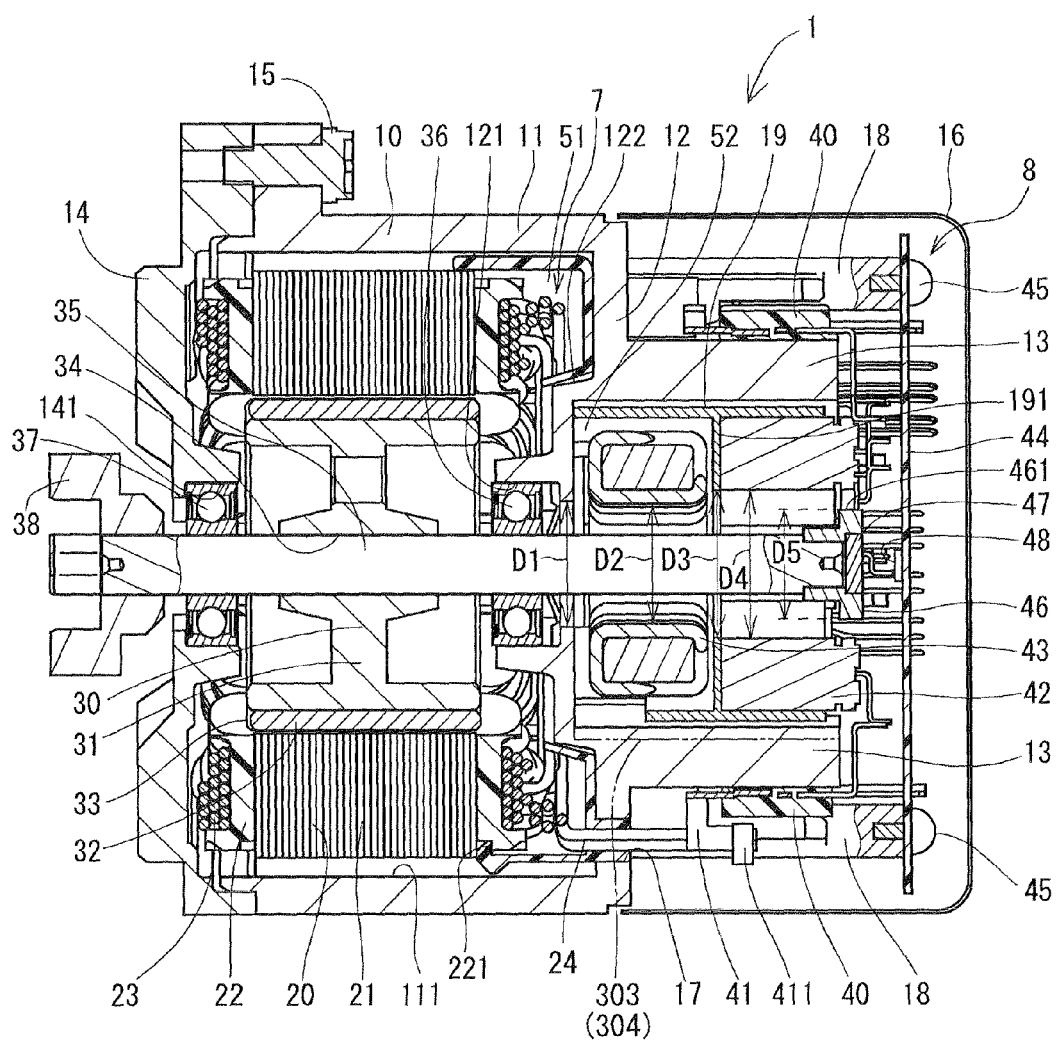
FIG. 1 is a longitudinal cross-sectional view of an electric motor according to a first embodiment of the present invention.

Embodiments of the present invention will be described with reference to the accompanying drawings. In the following embodiments, similar components will be indicated by the same reference numerals and will not be described redundantly for the sake of simplicity.

First Embodiment

Figure 2:
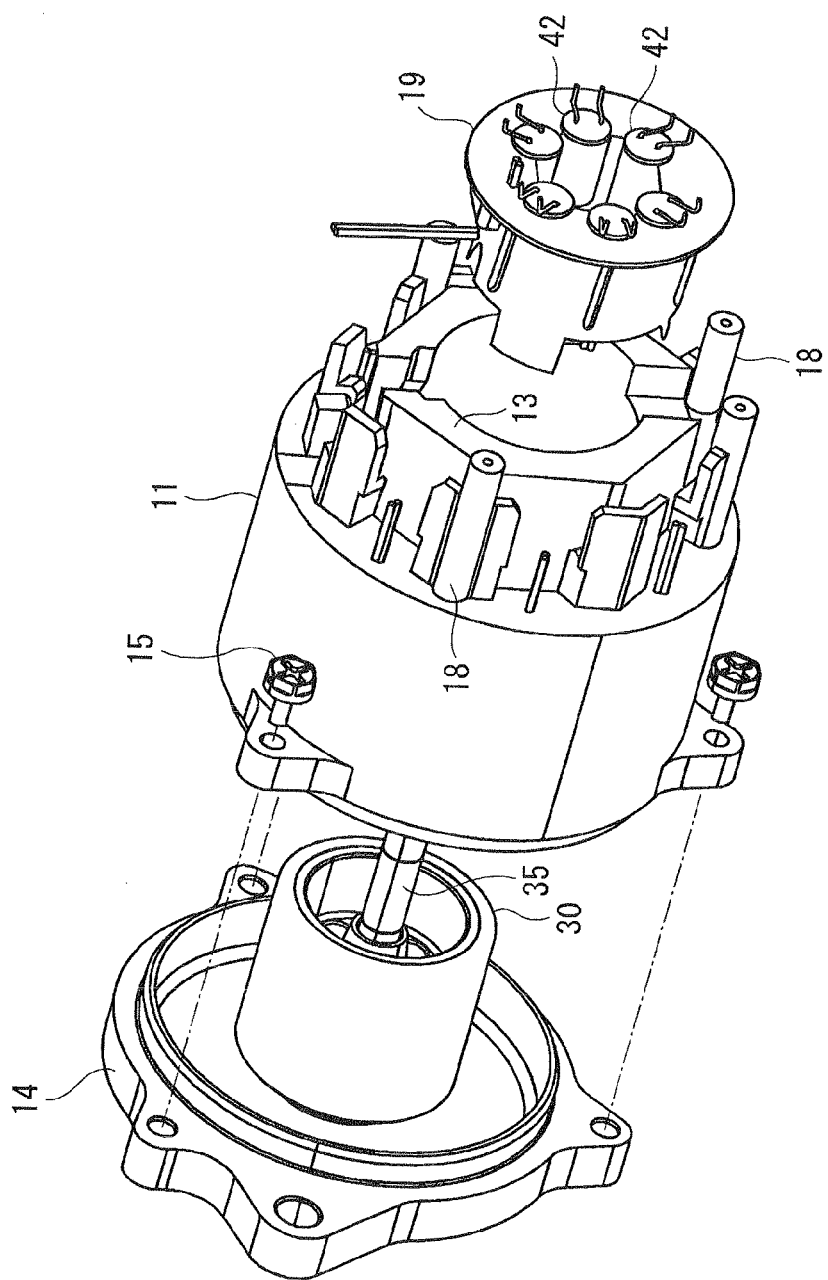
FIG. 2 is a perspective exploded view of the motor of the first embodiment.

An electric motor, which includes a circuit apparatus (drive circuit), according to a first embodiment, is used in an electric power steering (EPS) system of a vehicle. An output gear of the motor is meshed with a gear, which is provided to a steering column. The motor is rotated in a normal rotational direction or a reverse rotational direction based on a vehicle speed signal and a steering torque signal to assist a steering operation of a driver for steering the vehicle. FIG. 1 is a longitudinal cross-sectional view of the motor 1, and FIG. 2 is an exploded perspective view of the motor 1. In FIG. 2, semiconductor modules, a circuit board and the like are omitted for the sake of simplicity.

As shown in FIG. 1, the motor (brushless motor) 1 includes a motor case 10, a stator 20, a rotor 30 and the semiconductor modules (serving as drive devices) 40.

The motor case 10 is made of, for example, an aluminum material and includes a tubular portion 11, a partition wall 12 and a heat sink 13, which are integrated together. The partition wall 12 extends radially inward from an axial end part of the tubular portion 11. The heat sink 13 projects from the partition wall 12 in the axial direction away from the tubular portion 11.

A cup shaped cover 16 is placed on a heat sink 13 side of the motor case 10 in the axial direction such that the cover 16 is generally coaxial with the motor case 10. The cover 16 protects a circuit apparatus 8, which includes the semiconductor modules 40. A frame end 14, which is configured into a circular plate form, is fixed to an opposite end part of the motor case 10, which is opposite from the heat sink 13.

The motor 1 has a drive apparatus 7 on one axial side of the partition wall 12. The motor 1 also has the circuit apparatus 8 on the other axial side of the partition wall 12. The drive apparatus 7 is placed in the interior of the motor case 10, and the circuit apparatus 8 is placed in the interior of the cover 16.

The drive apparatus 7 includes the stator 20 and the rotor 30.

The stator 20 is fixed to a peripheral part 111 of the tubular portion 11, which is formed as an inner peripheral wall of the tubular portion 11. The stator 20 includes salient poles (teeth) 21 and winding wires 23. The salient poles 21 radially outwardly project. The winding wires 23 are wound around the salient poles 21 through insulators 22. The salient poles 21 are made from a laminated iron core, which is formed by stacking thin magnetic plates one after another in the axial direction. In the present embodiment, the number of the salient poles 21 is twelve, and these salient poles 21 are arranged one after another in the circumferential direction of the peripheral part 111. The winding wires 23 are wound around the salient poles 21 through the insulators 22 and form two sets of three phases, i.e., a U-phase, a V-phase and a W-phase. Each of power supply lines 24, which extend from the winding wires 23 of the two sets of the three phases, extends through a corresponding one of six line holes 17. These six line holes 17 axially extend through the partition wall 12 in the plate thickness direction of the partition wall 12 and are arranged one after another in the circumferential direction. Each of the power supply lines 24, which extends through the corresponding one of the line holes 17, is then electrically connected to a corresponding one of the six semiconductor modules 40. When the electric current is switched to sequentially flow through the winding wires 23 through the power supply lines 24, a rotating magnetic field is generated at the stator 20.

The rotor 30 defines a predetermined radial clearance on a radially inner side of the stator 20 and is supported in a rotatable manner relative to the stator 20. The rotor 30 includes a rotor core 31, permanent magnets 32 and a rotor cover 33. The rotor core 31 is made of a magnetic material and is configured into a tubular form. The permanent magnets 32 are placed radially outward of the rotor core 31. The rotor cover 33 covers the rotor core 31 and the permanent magnets 32. The permanent magnets 32 form ten magnetic poles, which include five N-poles and five S-poles that are alternately arranged one after another in the rotational direction (circumferential direction).

A shaft 35 is fixed to a shaft hole 34, which extends through the rotor core 31 along a rotational axis of the rotor core 31. A first bearing 36 is press fitted to one axial end part of the shaft 35 where the circuit apparatus 8 is located. A second bearing 37 is press fitted to the other axial end part of the shaft 35, which is opposite from the circuit apparatus 8. The first bearing 36 is loosely fitted in a recess 121, which is formed in the partition wall 12. The second bearing 37 is loosely fitted in a recess 141, which is formed in the frame end 14. The recess 121 opens toward the drive apparatus 7 and has a bottom at the circuit apparatus 8 side. The bottom of the recess 121 limits movement of the rotor 30 toward the circuit apparatus 8. In this way, the rotor 30 is rotatable relative to the motor case 10 and the stator 20. An output gear 38 is fixed to an end part of the shaft 35, which axially projects outward from the frame end 14. The output gear 38 is meshed with the gear of the steering column of the vehicle to transmit the rotation of the rotor 30 to the steering column.

The circuit apparatus 8 includes the drive circuit, which has the six semiconductor modules 40.

The heat sink 13 projects from the partition wall 12 toward the circuit apparatus 8 in the axial direction. The heat sink 13 is integrally molded together with the motor case 10 through a die-casting process. The heat sink 13 is configured into a generally hexagonal tubular body having a space at the center of the heat sink 13.

The number of the semiconductor modules 40 is six, and these semiconductor modules 40 are arranged at generally equal intervals in the rotational direction (the circumferential direction) of the rotor 3. A heat releasing surface of each semiconductor module 40 contacts a corresponding one of outer peripheral surfaces of the heat sink 13, which is placed radially inward of the peripheral part 111 of the motor case 10. The semiconductor modules 40 are generally coaxially placed relative to the salient poles 21 of the stator 20.

Each semiconductor module 40 includes two power MOSFETs, a bus bar and terminals, which are resin molded. The bus bar connects between the two power MOSFETs. The six semiconductor modules 40 form two sets of the inverter circuits that form a three-phase alternating current power source.

Distal end parts of the terminals 41, which project outwardly from the mold resin of the semiconductor module 40, are folded, so that the power supply lines 24 are held by and are connected to the folded distal end parts of the terminals 41. The folded distal end part of each terminal 41 forms a connecting part 411. The line holes 17 are formed in the partition wall 12 on the axial side of the connecting parts 411 where the drive apparatus 7 is located. Therefore, each of the power supply lines 24 is received through the corresponding one of the line holes 17 and is directly connected to the corresponding one of connecting parts 411.

A cup 19, which is made of resin, is placed radially inward of the heat sink 13. The cup 19 is configured as generally cylindrical tube. A separation wall 191 radially inwardly projects from an axial center part of the generally cylindrical tube. Aluminum electrolytic capacitors 42 are placed on one axial side of the separation wall 191, which is opposite from the drive apparatus 7, and a choke coil 43 is placed on the other axial side of the separation wall 191. The aluminum electrolytic capacitors 42 absorb a surge voltage, which is generated by the switching operation of the power MOSFETs of the semiconductor modules 40. The choke coil 43 is formed by winding a coil wire into a toroidal form and reduces the electric power source noises.

A circuit board 44 is fixed with screws 45 to columns 18, which axially extend from the partition wall 12.

Next, the characteristic feature of the present embodiment will be described.

In the present embodiment, the shaft 35 penetrates through, i.e., is received through the circuit apparatus 8 such that a distal end part of the shaft 35 reaches a location that is adjacent to the circuit board 44. Specifically, the shaft 35 extends through an opening of the partition wall 12, a center hole of the choke coil 43, an opening of the separation wall 191 of the cup 19 and a space located radially inward of the aluminum electrolytic capacitors 42.

A permanent magnet 47 is installed to the distal end part of the shaft 35 through a mount 46. The mount 46 has an annular flange 461, which radially outwardly projects. The mount 46 has a large diameter portion, a small diameter portion and a step portion, which are coaxial with each other and are placed radially inward of the flange 461. The step portion connects between the large diameter portion and the small diameter portion. In the present embodiment, the permanent magnet 47 is securely held at the large diameter portion and the step portion. An inner peripheral surface of the small diameter portion is fitted to an outer peripheral surface of the shaft 35. Therefore, the permanent magnet 47 is placed coaxially with the shaft 35 and is reliably fixed to the shaft 35. A semiconductor magnetic sensor 48 is provided at a center part of the circuit board 44. Thereby, the permanent magnet 47 and the semiconductor magnetic sensor 48 are opposed to each other in the axial direction, and the semiconductor magnetic sensor 48 senses a change in the magnetic field generated from the permanent magnet 47. A Hall sensor, a magneto-resistive (MR) sensor or the like may be used as the semiconductor magnetic sensor 48. The mount 46 and the permanent magnet 47 cooperate together to serve as a shaft side sensor device, and the semiconductor magnetic sensor 48 serves as a circuit board side sensor device.

In the present embodiment, a minimum diameter of a receiving space, through which the shaft 35 is received, is one of an inner diameter D1 of the opening (through hole) of the partition wall 12, an inner diameter D2 of the choke coil 43, an inner diameter D3 of the opening (through hole) of the separation wall 191 of the cup 19 and a distance D4 between diametrically opposed two of the aluminum electrolytic capacitors 42. Here, an outer diameter D5 of the flange 461 of the mount 46 is smaller than any one of the above-described diameters D1-D4.

With the above construction, the shaft 35, to which the frame end 14, the rotor 30 and the mount 46 are installed, can be integrally assembled to or disassembled from the tubular portion 11. The first bearing 36 is securely press fitted to the shaft 35, and thereby the first bearing 36 can be assembled to or disassembled from the tubular portion 11 together with the shaft 35.

A step portion 122 is formed in the partition wall 12. Thereby, at a location radially outward of the step portion 122 of the partition wall 12, a drive space 51, which is present in the drive apparatus 7 side, axially extends toward the circuit apparatus 8 side. Also, at a location radially inward of the step portion 122 of the partition wall 12, a circuit space 52, which is present in the circuit apparatus 8 side, axially extends toward the drive apparatus 7 side. That is, the drive space 51 (more specifically, the axial extent of the drive space 51) and the circuit space 52 (more specifically, the axial extent of the circuit space 52) overlap with each other in the axial direction.

Furthermore, each of the first bearing 36 (more specifically, the axial extent of the first bearing 36) and the second bearing 37 (more specifically, the axial extent of the second bearing 37) overlaps with the winding wires 23 of the stator 20 (more specifically, the axial extent of the winding wires 23 of the stator 20) in the axial direction.

Next, advantages of the motor 1 of the present embodiment will be described.

In the motor 1 of the present embodiment, the permanent magnet 47, which is installed to the distal end part of the shaft 35 of the drive apparatus 7, and the semiconductor magnetic sensor 48, which is installed on the circuit board 44, cooperate together to form a sensor apparatus that senses the rotational angle of the rotor 30. As discussed above, in the case where the permanent magnet 47 is installed to the distal end part of the shaft 35 and is opposed to the semiconductor magnetic sensor 48, i.e., in the case where the permanent magnet 47 is placed coaxially with the shaft 35 at the end surface of the shaft 35, a positional displacement of the permanent magnet 47 in the axial direction can be reduced in comparison to a case where the permanent magnet is installed to a yoke that has the large width (diameter) in the radial direction. Thereby, the permanent magnet 47 can be placed sufficiently close to the semiconductor magnetic sensor 48, and thereby it is possible to reduce an error in a measurement of the rotational angle of the rotor 30. Therefore, the rotational angle of the rotor 30 can be more accurately measured.

Furthermore, in order to reduce the error in the measurement of the rotational angle, a relatively large radial extent of the permanent magnet 47 is generally required. However, according to the present embodiment, the permanent magnet 47 is placed in close proximity to the semiconductor magnetic sensor 48. Therefore, the radial extent of the permanent magnet 47 can be reduced. In this way, the size of the system having the motor of the present embodiment can be reduced.

Furthermore, the shaft 35 can be inserted into the circuit apparatus 8 without a need for disassembling the mount 46, to which the permanent magnet 47 is secured, from the shaft 35. In this way, the assembling operation and the maintenance operation of the motor can be eased. Specifically, the frame end 14, the rotor 30 and the shaft 35 can be integrally assembled or disassembled (see FIG. 2).

Furthermore, according to the motor 1 of the present embodiment, the partition wall 12 has the step portion 122, which forms the axial step. Thereby, the drive space 51 and the circuit space 52 overlap with each other in the axial direction. Thus, the axial size of the motor 1 can be reduced.

Furthermore, in the motor 1 of the present embodiment, each of the first bearing 36 and the second bearing 37 overlaps with the winding wires 23 of the stator in the axial direction (see FIG. 1). Thereby, the axial size of the motor can be further reduced.

Also, in the motor 1, the heat sink 13 projects from the partition wall 12 into the circuit space 52, and the heat releasing surface of each semiconductor module 40 contacts the heat sink 13. In this way, the heat, which is generated from the semiconductor module 40, can be sufficiently released through the heat sink 13. Also, the heat sink 13 is made of the aluminum material. Therefore, the high heat releasing performance and the light weight of the heat sink 13 and thereby of the motor having the same are made possible.

Furthermore, in the motor 1 of the present embodiment, the heat sink 13 is formed into the annular form and is placed at the location radially inward of the tubular portion 11. Thereby, the semiconductor modules 40 can be installed to the outer peripheral surfaces, respectively, of the heat sink 13. In addition, the terminal 41, which projects outwardly from the mold resin of the semiconductor module 40, has the connecting part 411. Therefore, the power supply line 24 is received through the corresponding line hole 17 and is directly connected to the corresponding connecting part 411. In this way, in comparison to a case where the power supply lines 24 are collected with bus bars, it is possible to further reduce the axial size of the motor.

Furthermore, in the motor 1 of the present embodiment, the choke coil 43 is arranged such that the shaft 35 extends through the center hole of the choke coil 43. In this way, it is possible to further reduce the size of the motor.

Second Embodiment

Figure 3:
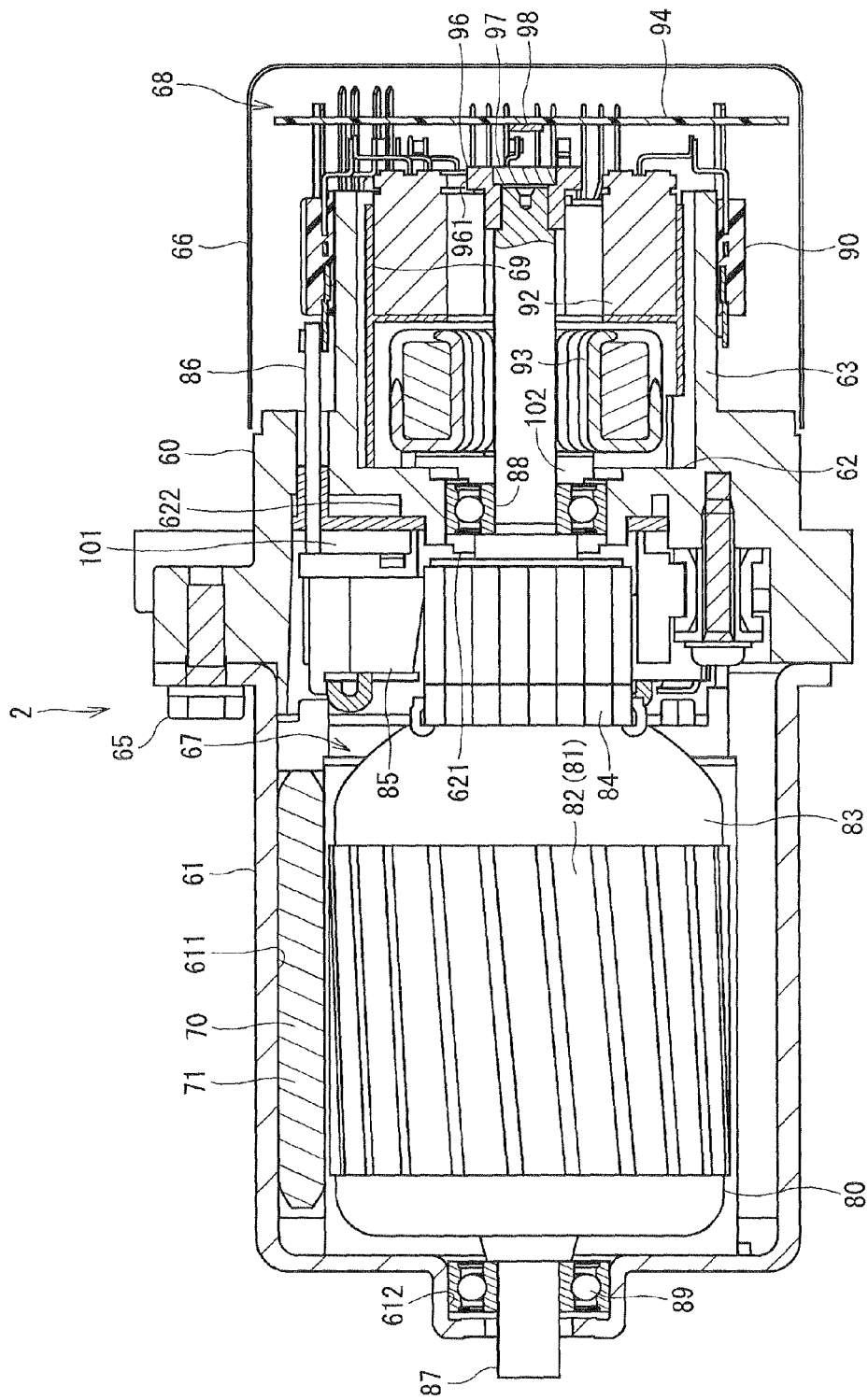
FIG. 3 is a longitudinal cross-sectional view of an electric motor according to a second embodiment of the present invention.

An electric motor of according to a second embodiment of the present invention includes a commutator and brushes. FIG. 3 is a longitudinal cross-sectional view of the motor. In FIG. 3, the winding wires of the rotor are schematically indicated.

As shown in FIG. 3, the motor 2 includes a motor case 60, a stator 70, a rotor 80 and semiconductor modules (serving as drive devices) 90.

The motor case 60 is made of, for example, the aluminum material and includes a tubular portion 61, a partition wall 62 and a heat sink 63. The partition wall 62 extends radially inward from an axial end part of the tubular portion 61. The heat sink 63 projects from the partition wall 62 in the axial direction.

A cup shaped cover 66 is placed on a heat sink 63 side of the motor case 60 in the axial direction such that the cover 66 is generally coaxial with the motor case 60. The cover 66 protects a circuit apparatus 68, which includes the semiconductor modules 90. The partition wall 62 is installed to an opening part of the tubular portion 61, which is configured into a cup-shaped body, with bolts 65. The heat sink 63 is formed in the partition wall 62.

The motor 2 has a drive apparatus 67 received in a drive space 101 on one axial side of the partition wall 62. The motor 2 also has the circuit apparatus 68 received in a circuit space 102 on the other axial side of the partition wall 62. The drive apparatus 67 is placed in the interior of the tubular portion 61, and the circuit apparatus 68 is placed in the interior of the cover 66.

The drive apparatus 67 includes the stator 70 and the rotor 80.

The stator 70 is fixed to a peripheral part 611 of the tubular portion 61, which serves as an inner peripheral wall of the tubular portion 61. The stator 70 includes permanent magnets 71 that are arranged one after another in the circumferential direction to form alternating magnetic poles (S-pole and N-pole) alternately arranged one after another in the circumferential direction.

The rotor 80 includes a rotor core 81 and winding wires 83. The rotor core 81 has salient poles 82, which are arranged one after another in the circumferential direction and project radially outward. The winding wires 83 are wound around the salient poles 82. The commutator 84 is placed on one axial side of the rotor core 81 where the circuit apparatus 68 is located. The brushes 85 are provided in the drive apparatus 67 and slidably contact commutator segments of the commutator 84 to maintain an electrical connection with the commutator 84. Power supply lines 86 are pulled out toward the circuit apparatus 68 side through the brushes 85, respectively. When the electric power is supplied to the rotor 80 through the power supply lines 86, the brushes 85 and the commutator 84, the rotor 80 generates a rotating magnetic field.

A shaft 87 is fixed to a shaft hole, which extends through the rotor core 81 along a rotational axis of the rotor core 81. A first bearing 88 is press fitted to one axial end part of the shaft 87 where the circuit apparatus 68 is located. A second bearing 89 is press fitted to the other axial end part of the shaft 87, which is opposite from the circuit apparatus 68. The first bearing 88 is loosely fitted to the partition wall 62 on the circuit apparatus 68 side of the opening 621 of the partition wall 62. The second bearing 89 is loosely fitted to a recess 612, which is formed in the tubular portion 61. In this way, the rotor 80 is rotatable relative to the motor case 60 and the stator 70.

The circuit apparatus 68 includes the semiconductor modules 90, aluminum electrolytic capacitors 92, a choke coil 93 and a circuit board 94. The structure of the circuit apparatus 68 is similar to that of the circuit apparatus 8 of the first embodiment and thereby will not be described for the sake of simplicity.

Next, the characteristic feature of the present embodiment will be described.

In the present embodiment, the shaft 87 penetrates through the circuit apparatus 68 such that a distal end part of the shaft 87 reaches a location that is adjacent to the circuit board 94. A permanent magnet 97 is installed to a distal end part of the shaft 87 through a mount 96. The mount 96 has an annular flange 961, which radially outwardly projects, so that the permanent magnet 97 is reliably secured to the mount 96. The semiconductor magnetic sensor 98 is provided at the center part of the circuit board 94. Thereby, the permanent magnet 97 and the semiconductor magnetic sensor 98 are opposed to each other in the axial direction, and the semiconductor magnetic sensor 98 senses a change in the magnetic field generated from the permanent magnet 97. A Hall sensor, a magneto-resistive (MR) sensor or the like may be used as the semiconductor magnetic sensor 98. The mount 96 and the permanent magnet 97 cooperate together to serve as a shaft side sensor device, and the semiconductor magnetic sensor 98 serves as a circuit board side sensor device. Similar to the above embodiment, even in the present embodiment, the shaft 87 is designed to be received through the circuit apparatus 68 without a need for disassembling the mount 96 from the shaft 87.

With the above construction, the shaft 87, to which the tubular portion 61, the rotor 80 and the mount 96 are installed, can be integrally assembled to or disassembled from the partition wall 62. The first bearing 88 is securely press fitted to the shaft 87, and thereby the first bearing 88 can be assembled to or disassembled from the partition wall 62 together with the shaft 87.

Next, advantages of the motor 2 of the present embodiment will be described.

In the motor 2 of the present embodiment, the permanent magnet 97, which is installed to the distal end part of the shaft 87 of the drive apparatus 67, and the semiconductor magnetic sensor 98, which is installed on the circuit board 94, cooperate together to form a sensor apparatus that senses the rotational angle of the rotor 80. As discussed above, in the case where the permanent magnet 97 is installed to the distal end part of the shaft 87 and is opposed to the semiconductor magnetic sensor 98, i.e., in the case where the permanent magnet 97 is placed coaxially with the shaft 87 at the end surface of the shaft 87, a positional displacement of the permanent magnet 97 in the axial direction can be reduced in comparison to a case where the permanent magnet is installed to the yoke that has the large width in the radial direction. Thereby, the permanent magnet 97 can be placed sufficiently close to the semiconductor magnetic sensor 98, and thereby it is possible to reduce an error in a measurement of the rotational angle. Therefore, the rotational angle can be accurately measured.

Furthermore, in order to reduce the error in the measurement of the rotational angle, a relatively large radial extent of the permanent magnet 47 is required. However, according to the present embodiment, the permanent magnet 97 is placed in close proximity to the semiconductor magnetic sensor 98. Therefore, the radial extent of the permanent magnet 97 can be reduced. In this way, the size of the system having the motor of the present embodiment can be reduced.

Furthermore, the shaft 87 can be inserted into the circuit apparatus 68 without a need for disassembling the mount 96, to which the permanent magnet 97 is secured, from the shaft 87. In this way, the assembling operation and the maintenance operation of the motor can be eased. Specifically, the tubular portion 61, the rotor 80 and the shaft 87 can be assembled integrally or can be disassembled integrally.

Also, in the motor 2, the heat sink 63 projects from the partition wall 62 into the circuit space 102, and the heat releasing surface of each semiconductor module 90 contacts the heat sink 63. In this way, the heat, which is generated from the semiconductor module 90, can be sufficiently released through the heat sink 63. Also, the heat sink 63 is made of the aluminum material. Therefore, the high heat releasing performance and the light weight of the heat sink 63 and thereby of the motor having the same are made possible.

Furthermore, in the motor 2 of the present embodiment, the heat sink 63 is formed into the annular form and is placed at the location radially inward of the tubular portion 61. Thereby, the semiconductor modules 90 can be installed to the outer peripheral surfaces, respectively, of the heat sink 63. In addition, the terminal 41, which projects outwardly from the mold resin of the semiconductor module 90, is directly connected to the corresponding power supply line 86. In this way, in comparison to a case where the power supply lines 86 are collected with bus bars, it is possible to further reduce the axial size of the motor.

Furthermore, in the motor 2 of the present embodiment, the choke coil 93 is arranged such that the shaft 87 extends through the center hole of the choke coil 93. In this way, it is possible to further reduce the size of the motor.

The present invention is not limited to the above embodiments, and the above embodiments may be modified within the spirit and scope of the present invention.

(I) In the motor 1 of the above embodiment, the step portion 122 is formed in the partition wall 12. Thereby, at the location radially outward of the step portion 122 of the partition wall 12, the drive space 51, which is present in the drive apparatus 7 side, axially extends toward the circuit apparatus 8 side. Also, at the location radially inward of the step portion 122 of the partition wall 12, the circuit space 52, which is present in the circuit apparatus 8 side, axially extends toward the drive apparatus 7 side. Thereby, the drive space 51 and the circuit space 52 overlap with each other in the axial direction. This is due to the fact that the occupied area of the stator 20 is larger than the occupied area of the rotor 30 in the view taken in the axial direction.

Therefore, in contrast, in a case where the occupied area of the rotor is larger than the occupied area of the stator, a radially inner area, in which the rotor is placed, may be extended toward the circuit space, and a radially outer area, in which the stator is placed, may be extended toward the drive space. Thereby, these areas (axial extents of these areas) may overlap with each other in the axial direction.

Furthermore, the step portion 122 may be eliminated from the partition wall 12. In such a case, the drive space and the circuit space may not overlap with each other in the axial direction.

(II) In the motor 1, each of the first bearing 36 and the second bearing 37 overlaps with the winding wires 23 of the stator 20 in the axial direction.

This construction may be modified as follows. That is, only one of the first bearing 36 and the second bearing 37 may overlap with the winding wires 23 of the stator 20 in the axial direction. Even in this way, the axial size of the motor can be reduced or minimized.

Also, the first bearing 36 and the second bearing 37 may be axially further spaced from each other such that the first bearing 36 and the second bearing 37 do not overlap with the winding wires 23 of the stator 20 in the axial direction.

Furthermore, the circuit apparatus side bearing, which is normally placed in the drive space, may be placed in the circuit space. In this way, the distance between the bearings is increased, so that it is possible to implement the stable rotation of the shaft, thereby contributing a reduction in the error in the rotational angle.

(III) In the motor 1, 2 of the above embodiments, there is provided the heat sink 13, 63, which is made of the aluminum and projects from the partition wall 12, 62. Alternatively, the heat sink may be made of other metal other than the aluminum.

Furthermore, as long as the amount of heat generation is small, the heat sink may be eliminated from the motor.

(IV) In the above embodiments, although the inner peripheral wall surface of the heat sink 13, 63 is not discussed, it is possible to form an axial groove(s) 303 or axial ridge(s) 304 in the inner peripheral wall surface of the heat sink 13, 63. Although the axial groove 303 or the axial ridge 304 is indicated with an imaginary line only in FIG. 1, the axial groove 303 or the axial ridge 304 is also equally applicable in the second embodiment shown in FIG. 3. With this modification, the total surface area is increased, and thereby the heat releasing performance can be further improved. Furthermore, in the case where the groove(s) or the ridge(s) extend in the axial direction, the heat sink 13, 63 can be easily formed through an aluminum die casting process.

(V) In the motor 1, 2 of the above embodiments, the heat sink 13, 63 is placed radially inward of the tubular portion 11, 61 such that the semiconductor modules 40, 90 are installed to the outer peripheral surfaces of the heat sink 13, 63. Alternatively, the heat sink may be formed as, for example, an extension of the cylindrical portion and thereby constitutes an outer shell (housing) of the motor.

(VI) In the motor 1, 2 of the above embodiments, the semiconductor modules 40, 90 are directly connected to the power supply lines 24, 86. Alternatively, bus bars may be provided to collectively place the power supply lines.

(VII) In the motor 1, 2 of the above embodiments, the choke coil 43, 93 is provided, and the shaft 35, 87 is received through the center hole of the choke coil 43, 93. Alternatively, the shaft is not necessarily received through the center hole of the choke coil 43, 93. Also, the choke coil 43, 93 may be eliminated from the motor 1, 2 of the above embodiments.

(VIII) In the above embodiments, the present invention is described with respect to the motor, which has the electronic circuit received therein and is used in the EPS system of the vehicle. Alternatively, the motor of the present invention, which has the electronic circuit (circuit apparatus) received therein, can be used in any other suitable apparatus or system, such as a wiper system, a valve timing control system or the like.

(IX) In the above embodiments, the present invention is discussed with reference to the inner rotor motor. However, the present invention is equally applicable to an outer rotor motor.

Additional advantages and modifications will readily occur to those skilled in the art. The invention in its broader terms is therefore not limited to the specific details, representative apparatus, and illustrative examples shown and described.

What is claimed is:

1. An electric motor comprising:
    a drive apparatus that includes:
        a stator;
        a rotor that is placed radially inward of the stator and is rotatable relative to the stator; and
        a shaft that is rotatable integrally with the rotor;
    a circuit apparatus that is placed on one side of the drive apparatus in an axial direction of the shaft and includes a drive device that drives the drive apparatus; and
    a motor case that has a partition wall, wherein the partition wall partitions between a drive space, in which the drive apparatus is placed, and a circuit space, in which the circuit apparatus is placed, in the axial direction in the motor case, wherein:
    the circuit apparatus includes a circuit board;
    the circuit board is placed at an end part of the circuit space, said end part being spaced apart from the drive apparatus in the axial direction;

the circuit board has a circuit board side sensor device that forms a sensor apparatus that senses a rotational angle of the rotor;

the shaft has a shaft side sensor device at an end part of the shaft to correspond with the circuit board side sensor device;

the shaft side sensor device forms the sensor apparatus in cooperation with the circuit board side sensor device;

an outer diameter of the shaft side sensor device is smaller than an inner diameter of a through hole defined through the partition wall, and through which the shaft extend; and the shaft, with the shaft side sensor device at said end part thereof, is configured to be inserted through the through hole of the partition wall and through the circuit apparatus, without disassembling the shaft side sensor device from the end part of the shaft, to place the shaft side sensor device in an opposed relationship to the circuit board side sensor device at a location adjacent to the circuit board side sensor device.

2. The electric motor according to claim 1, wherein:

the electric motor is a brushless motor; and the stator has a plurality of winding wires to generate a rotating magnetic field.

3. The electric motor according to claim 2, wherein:

the partition wall has a step portion that forms an axial step; and the step portion of the partition wall is configured to define the drive derive space and the circuit space such that an axial extent of the drive space and an axial extent of the circuit space overlaps with each other in the axial direction.

4. The electric motor according to claim 3, wherein an axial extent of a radially outer area of the drive space, at which the stator is placed, overlaps with an axial extent of a radially inner area of the circuit space in the axial direction.

5. The electric motor according to claim 2, wherein:

the shaft is rotatably supported by a first bearing and a second bearing; and at least one of an axial extent of the first bearing and an axial extent of the second bearing overlaps with an axial extent of the plurality of winding wires of the stator in the axial direction.

6. The electric motor according to claim 1, wherein the shaft is rotatably supported by a first bearing and a second bearing, one of which is placed in the circuit space.

7. The electric motor according to claim 1, further comprising a heat sink that projects from the partition wall into the circuit space, wherein a heat releasing surface of the drive device contacts the heat sink.

8. The electric motor according to claim 7, wherein the heat sink is made of an aluminum material.

9. The electric motor according to claim 7, wherein the heat sink has one of an axial groove and an axial ridge that extends in the axial direction.

10. The electric motor according to claim 7, wherein:

the motor case includes a tubular portion that receives the drive apparatus;

the partition wall extends from an axial end part of the tubular portion; and the heat sink is configured into an annular form and is placed radially inward of the tubular portion to enable installation of the drive device to an outer peripheral wall surface of the heat sink.

11. The electric motor according to claim 1, wherein:

the drive device is one of a plurality of drive devices, which are arranged one after another in a circumferential direction in the circuit space to correspond with the stator;

a terminal of each of the plurality of drive devices is directly connected with a corresponding one of a plurality of power supply lines; and each of the plurality of power supply lines extends from a plurality of winding wires and is received through a corresponding one of a plurality of line holes that extend through the partition wall.

12. The electric motor according to claim 1, wherein:

the circuit apparatus includes a choke coil that has a coil wire wound into a toroidal form; and the shaft of the drive apparatus is received through a center hole of the choke coil.

13. The electric motor according to claim 1, wherein:

the shaft side sensor device includes a magnet; and the circuit board side sensor device senses a magnetic change caused by rotation of the shaft side sensor device.

14. The electric motor according to claim 12, wherein the outer diameter of the shaft side sensor device is smaller than an inner diameter of the center hole of the choke coil.

\* \* \* \* \*